UNITED STATES PATENT OFFICE 2,659,721

TRISAZO DYESTUFFS

Werner Bossard, Riehen, near Basel, and Otto Bitterlin, Basel, Switzerland, assignors to J. R. Geigy A. G., Basel, Switzerland, a Swiss firm No Drawing. Application November 29, 1951, Serial No. 258,993

Claims priority, application Switzerland December 15, 1950

6 Claims. (Cl. 260—172)

The present process concerns the production of substantive trisazo dyestuffs which are characterised by their good drawing power on to cellulose fibres from a bath containing Glauber's salt, by the pure shades of their direct cellulose dyeings and the excellent fastness to water thereof and by their very good dischargeability.

It is not sufficient for the production of white or multi-coloured discharges that the dyeing which serves as a base is pure white dischargeable; in addition it must have very good fastness to water so that the dyestuff does not run from the dyed to the discharged places when the cleavage products are washed out. Up to now, generally only after-treated dyeings have been able to be used for discharge articles which with suitable composition of the used azo dyestuff are made insoluble and sufficiently fast to water either by diazotisation on the fibre and coupling with the azo components having no groups making them soluble (diazotisation dyestuffs), or by coupling on the fibre with diazo compounds having no groups rendering them soluble (development dyestuffs), or by after-treatment with formaldehyde (formal dyestuffs), or metallising on the fibre. In contrast to these types of dyestuffs, azo dyestuffs; the direct cellulose dyeings of which can be discharged without any after-treatment, are much more easy to apply and therefore are more advantageous from the point of view of materials and time required. They are, therefore, very highly valued. The present invention enables such dyestuffs usable for the direct dyeing of discharge articles to be prepared.

The trisazo dyestuffs according to the invention are obtained by coupling diazomonoazo compounds of the general formula I:

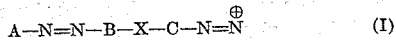

wherein X represents a member selected from the group consisting of the diphenyl linkage, the —CO—NH— and —NH—CO-radicals, A represents an unsulfonated radical of the benzene series containing a carboxyl group in the m-position and a hydroxyl group in the p-position to the —N=N— group, B and C represent an unsulfonated radical of the benzene series, with 2-(4'-aminobenzoylamino)-5-hydroxynaphthalene-7-sulfonic acids, further diazotising the disazo dyestuff so obtained and coupling with 1 mol of 1.3-dihydroxybenzene as end component.

The diazomonoazo compounds usable according to the invention are obtained according to various methods all of which are known per se, e. g. by tetrazotisation of 4.4'-diaminodiphenyl- or of 4-(4'-aminobenzolyamino)-1-aminobenzene compounds and unilateral coupling with an o-hydroxycarboxylic acid of the benzene series coupled in the para position to the hydroxyl group. Also the 4'-amino-4-hydroxy-3-carboxy-azobenzene compounds obtained by methods known per se can be acylated with 4-nitrobenzoyl halides, the nitro group converted into the primary amino group by known methods, e. g. with sodium sulfide and the aminoazo dyestuff so obtained diazotised. Alkyl, in particular, methyl groups can be named as possible substituents of the radicals B and C, while apart from salicyclic acid, the homologues of this compound coupled in the para position to the hydroxyl group come into consideration as starting components. Chiefly 2-(4'-aminobenzoylamino)-5-hydroxynaphthalene-7-sulfonic acid comes into consideration as technically easily accessible coupling component usable according to the present invention. The coupling with the 2-(4'-aminobenzoylamino-5-hydroxynaphthalene-7-sulfonic acids is made in the usual way in a weakly alkaline aqueous medium, for example in the presence of sodium bicarbonate. The further diazotisation of the amino-disazo dyestuff is done in an aqueous suspension with sodium nitrite and mineral acid and the final coupling with 1.3-dihydroxybenzene is performed advantageously in a soda-alkaline aqueous solution.

According to the individual composition, the trisazo dyestuffs according to the invention dye cellulose fibres in shades from yellowish to scarlet reds and scarlet to wine reds from a dyebath containing Glauber's salt. The dyestuffs according to the invention, the radicals B and C of which contain no other substituents, produce particularly pure shades. Although halogen and methyl groups only slightly cloud the shade, alkoxy groups do so to a greater extent. The dyestuffs according to the invention having the bridging members —NH—CO— and

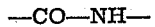

are characterised by particularly brilliant shades.

All the dyestuffs according to the invention are characterised by good water fastness of the cellulose dyeings and are pure white dischargeable.

It is, of course, known that the substantive disazo dyestuffs obtained from 4-(4''-aminobenzoylamino)-4'-hydroxy-3'-carboxy-azobenzene and 2-(4'-aminobenzoylamino)-5-hydroxynaphthalene-7-sulfonic acid can be diazotised on the fibre and can be coupled with the usual developing agents to produce trisazo dyestuffs. As, however, the water solubility and substantivity of the substantive diazotisation dyestuffs are generally altered fundamentally during development, the good substantivity of the trisazo dyestuffs according to the invention and the good fastness to water of their cellulose dyeings was not obvious from the known facts.

The following examples illustrate the invention without limiting it in any way. Parts are given as parts by weight and the temperatures are in degrees centigrade.

*Example 1*

18.4 parts of 4.4'-diaminodiphenyl are tetrazotised in the usual way in a hydrochloric acid solution with 13.8 parts of sodium nitrite. The tetrazo solution is then coupled alkaline with 14.3 parts of 2-hydroxybenzene-1-carboxylic acid and then with 35.8 parts of 2-(4'-aminobenzoylamino)-5-hydroxynaphthalene-7-sulfonic acid in a bicarbonate alkaline solution. The disazo dyestuff which is difficultly soluble is filtered off at 50° and pasted in 1000 parts of water and 1.6 parts of 100% caustic soda lye. After the addition of 7.6 parts of sodium nitrite, diazotisation is performed by the quick addition of 48 parts of 30% hydrochloric acid at 10°. On completion of the diazotisation, the suspension is poured into an aqueous solution of 11 parts of 1.3-dihydroxybenzene and 50 parts of soda. After the addition of common salt, the trisazo dyestuff of the formula:

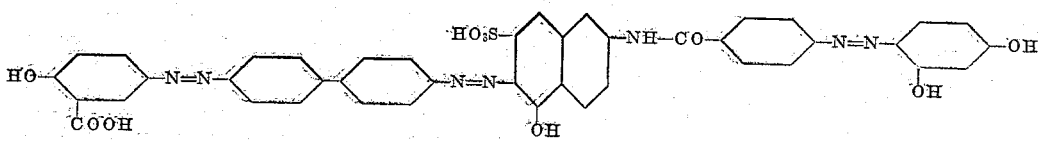

is filtered hot and dried. It is a brown powder which dissolves in water with a red and in concentrated sulphuric acid with a dark blue colour. The dyestuff dyes natural or regenerated cellulose fibres in bluish-red shades which have excellent fastness to water and can be discharged pure white.

If 21.2 parts of 3.3'-dimethyl-4.4'-diaminodiphenyl are used instead of 18.4 parts of 4.4'-diaminodiphenyl or if 15.7 parts of 3- or 4-methyl-2-hydroxybenzene-1-carboxylic acid are used instead of 14.3 parts of 2-hydroxybenzene-1-carboxylic acid and the procedure described above is followed, dyestuffs with similar properties are obtained.

*Example 2*

28.5 parts of the sodium salt of the aminoazo dyestuff produced in the usual manner either by coupling 1-amino-4-nitrobenzene with 2-hydroxybenzene-1-carboxylic acid and then reducing the nitro group, or diazotising 1-acetylamino-4-aminobenzene, coupling with 2-hydroxybenzene-1-carboxylic acid and finally saponifying the acetylamino group, are dissolved in 220 parts of water at 70°.

22.5 parts of 4-nitrobenzoyl chloride and 6.6 parts of soda are added. When a sample can no longer be diazotised 13.6 parts of dehydrated sodium sulphide are added, the temperature is raised to 80° and kept for some time at this temperature after which 120 parts of common salt are added and the reaction mixture is filtered. The aminobenzoylated monoazo dyestuffs so obtained is pasted in 600 parts of water and 5.5 parts of 100% caustic soda lye. 7.6 parts of sodium nitrite are added and the whole is added dropwise at 35° to 68 parts of conc. hydrochloric acid and 68 parts of water. On completion of the diazotisation, the diazo compound is coupled with an aqueous solution of 35.8 parts of 2-(4'-aminobenzoylamino)-5-hydroxynaphthalene - 7 - sulfonic acid in the presence of 15 parts of sodium bicarbonate at 20°. The disazo dyestuff which is difficultly soluble is filtered off at 90°, washed free of the accompanying yellow by-products, pasted in 1000 parts of water and 1.6 parts of 100% caustic soda lye at 10° and, after the addition of 7.6 parts of sodium nitrite, diazotised by the quick addition of 48 parts of 30% hydrochloric acid. After 6 hours, the suspension is coupled with a solution of 11 parts of 1.3-dihydroxybenzene and 55 parts of soda. After 24 hours, 350 parts of common salt are added to the trisazo dyestuff of the following formula:

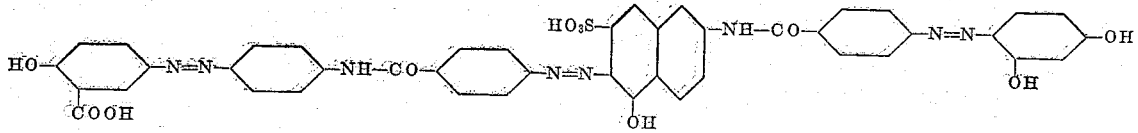

while it is hot, whereupon it is filtered off and dried. The dyestuff is a red-brown powder which dissolves with a red colour both in water and in conc. sulfuric acid. It dyes cellulose in pure yellowish-red shades which are remarkably fast to water and can be discharged pure white. If, in the place of the 28.5 parts of the monoazo dyestuff from 1-amino-4-nitrobenzene and 2-hydroxybenzene-1-carboxylic acid, 29.8 parts of the monoazo dyestuff from 4-nitro-2- or -3-methyl-1-aminobenzene and 2-hydroxybenzene-1-carboxylic acid are used and if instead of 2-hydroxybenzene-1-carboxylic acid, the equivalent number of parts of 3-methyl-2-hydroxybenzene-1-carboxylic acid or 4-methyl-2-hydroxybenzene-1-carboxylic acid are used for the production of the monoazo dyestuff and the procedure described above is followed, dyestuffs are obtained which have similar properties.

*Example 3*

31.0 parts of the sodium salt of the monoazo dyestuff from diazotised 5-amino-2-hydroxybenzene-1-carboxylic acid and 3-amino-1-methylbenzene are dissolved in 550 parts of water at 70°, after which 22.4 parts of 4-nitrobenzoyl chloride and 7 parts of soda are added in portions at this temperature. After 2 hours, the nitrobenzoyl compound with 12.9 parts of dehydrated sodium sulfide dissolved in 60 parts of water is reduced to the aminobenzoyl compound at 60–70°. This is then precipitated at 20° with 300 parts of common salt and filtered off.

The aminomonoazo dyestuff obtained in this way is then pasted in 600 parts of water and 5.5 parts of 100% caustic soda lye, 7.6 parts of sodium nitrite are added and the suspension is then added dropwise to 68 parts of 30% hydrochloric acid and 68 parts of water at 35°. After a few hours, the diazo compound is coupled at 0–5° with a solution of 35.8 parts of 2-(4'-aminobenzoylamino)-5-hydroxynaphthalene-7-sulfonic acid and 15 parts of sodium bicarbonate in 720 parts of water. The next day 150 parts of common salt are added to the disazo dyestuff, it is then filtered off and pasted at 10° in 1000 parts of water and 1.6 parts of caustic soda lye. After the addition of 7.6 parts of sodium nitrite, 48 parts of 30% hydrochloric acid are quickly poured in and after a few hours the diazo compound is coupled to an aqueous solution of 11 parts of 1.3-dihydroxybenzene and 55 parts of soda. The trisazo dyestuff of the formula:

35.8 parts of 2-(4'-aminobenzoylamino)-5-hydroxynaphthalene-7-sulfonic acid in the presence of 45.4 parts of sodium bicarbonate at 40°. After 24 hours, the disazo dyestuff which has completely formed is filtered off, stirred into 1000 parts of water and 1.6 parts of 100% caustic soda lye and, at 10°, 7.6 parts of sodium nitrite and finally 48 parts of 30% hydrochloric acid are added. On completion of the diazotisation, the suspension is poured into and so coupled with an aqueous solution of 11 parts of 1.3-dihydroxybenzene and 50 parts of soda. The trisazo dyestuff which is difficultly soluble is filtered off at 50° and dried.

It has the formula:

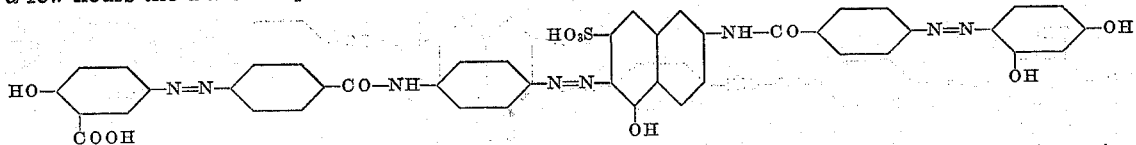

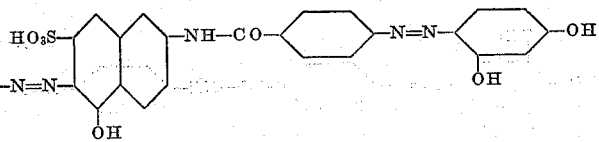

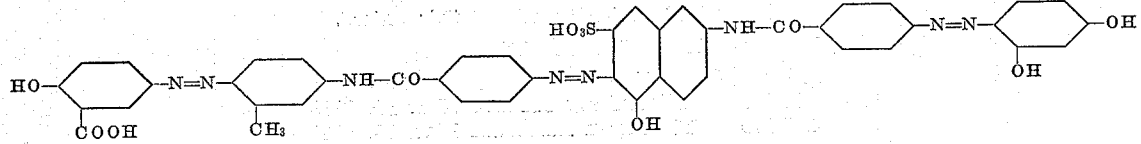

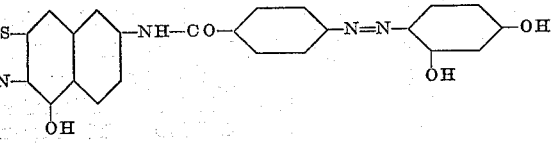

is salted out at 60° with 160 parts of common salt, filtered off and dried. It is a red-brown powder which dissolves in water and in concentrated sulfuric acid with a red colour. The dyestuff dyes cellulose fibres in yellowish red shades which are very fast to water and can be discharged pure white.

If, in the monoazo dyestuff from 5-amino-2-hydroxybenzene-1-carboxylic acid and 3-amino-1-methylbenzene above described the 3-amino-1-methylbenzene is replaced by the equivalent number of parts of 2-amino-1.4-dimethylbenzene and the procedure described in this example is followed, dyestuffs with similar properties are obtained.

*Example 4*

22.7 parts of 1-(4'-aminobenzoylamino)-4-aminobenzene and 13.8 parts of sodium nitrite are tetrazotised at 10–11° in the usual way and then coupled with a solution of 15.2 parts of 2-hydroxybenzene-1-carboxylic acid and 35 parts of soda in 250 parts of water. After the diazomonoazo dyestuff has formed, the suspension and is a brown powder. It dissolves in water with a brown-red colour and in concentrated sulfuric acid with a dark red colour. Cellulose fibres are dyed in pure red shades which have excellent water fastness properties. In addition, the dyeings are pure white dischargeable both from a neutral or alkaline medium.

If, in the above example, the 22.7 parts of 1-(4'-aminobenzoylamino)-4-aminobenzene are replaced by 24.1 parts of 1-(4'-aminobenzoylamino)-4-amino-2-methylbenzene or 25.5 parts of 1-(4'-aminobenzoylamino)-4-amino-2.5-dimethylbenzene or the 15.2 parts of 2-hydroxybenzene-1-carboxylic acid are replaced by 16.6 parts of 3- or 4-methyl-2-hydroxybenzene-1-carboxylic acid and the procedure described above is followed, dyestuffs with similar properties are obtained.

What we claim is:

1. A trisazo dyestuff of the general formula:

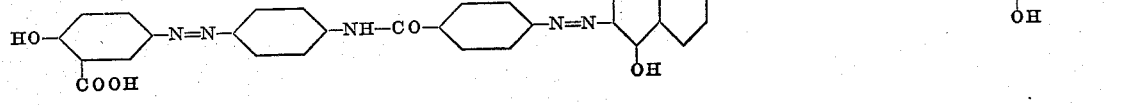

wherein X represents a member selected from the group consisting of the diphenyl linkage, the —CO—NH— and —NH—CO— radicals, $Y_1$ $Y_2$ and $Y_3$ are selected from the group consisting of hydrogen and lower alkyl groups.

2. A trisazo dyestuff of the formula:

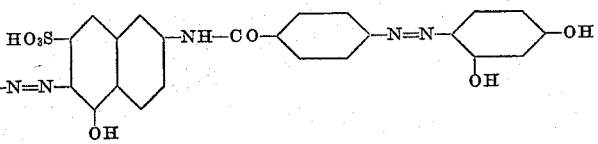

which has been neutralised with 25 parts of 30% hydrochloric acid is coupled to a solution of 3. A trisazo dyestuff of the formula:

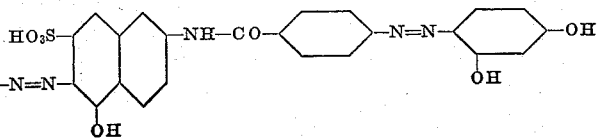

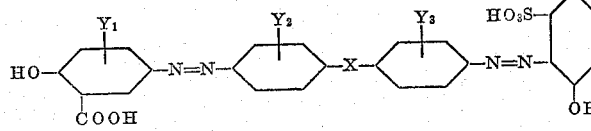

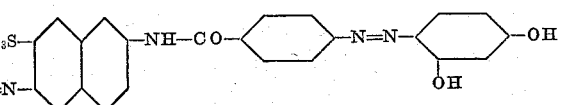

4. A trisazo dyestuff of the formula:
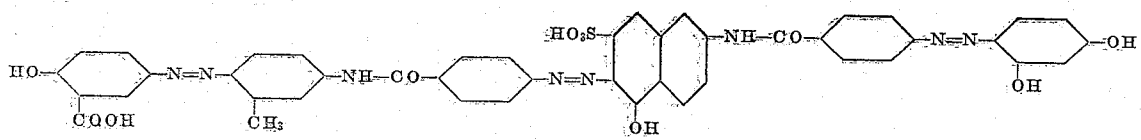
5. A trisazo dyestuff of the formula:
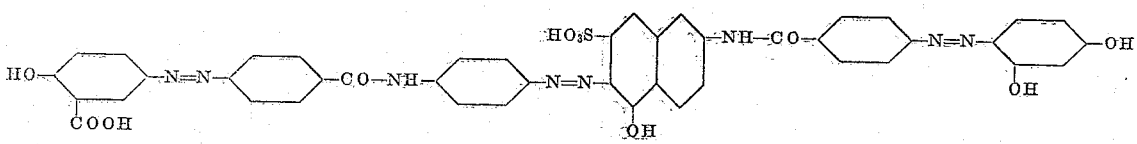
6. A trisazo dyestuff of the formula:
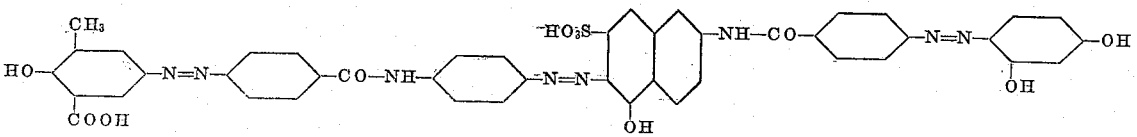
WERNER BOSSARD.
OTTO BITTERLIN.
References Cited in the file of this patent
UNITED STATES PATENTS
| Number | Name | Date |
|---|---|---|
| 1,901,393 | Glietenberg | Mar. 14, 1933 |
| 2,195,089 | Kollmann | Mar. 26, 1940 |
| 2,196,028 | Roos | Apr. 2, 1940 |